United States Patent
Legerot

[19]

[11] Patent Number: 5,842,711
[45] Date of Patent: Dec. 1, 1998

[54] BICYCLE FRAME

[75] Inventor: Gérard Legerot, Noisy-le-Grand, France

[73] Assignee: Bird S.A., Le Bourget-du-Lac, France

[21] Appl. No.: 676,172

[22] PCT Filed: Nov. 16, 1994

[86] PCT No.: PCT/FR94/01339

§ 371 Date: Jul. 19, 1996

§ 102(e) Date: Jul. 19, 1996

[87] PCT Pub. No.: WO96/15020

PCT Pub. Date: May 23, 1996

[51] Int. Cl.⁶ .................................................. B62K 3/02
[52] U.S. Cl. ...................................... 280/281.1; 280/288.3
[58] Field of Search .................................. 280/274, 275, 280/276, 277, 278, 279, 280, 281.1, 283, 288.1, 288.3

[56] References Cited

U.S. PATENT DOCUMENTS

| | | | |
|---|---|---|---|
| 4,097,639 | 6/1978 | Millar ........................................ | 428/215 |
| 4,145,068 | 3/1979 | Toyomasu et al. . | |
| 4,479,662 | 10/1984 | Defour et al. ........................ | 280/281.1 |
| 4,856,800 | 8/1989 | Hashimoto et al. .................. | 280/281.1 |
| 4,882,383 | 11/1989 | Ting ........................................... | 525/71 |
| 4,900,048 | 2/1990 | Derujinsky ............................. | 280/281.1 |
| 4,982,975 | 1/1991 | Trimble .................................. | 280/281.1 |
| 5,011,172 | 4/1991 | Bellanca et al. ....................... | 280/281.1 |
| 5,186,993 | 2/1993 | Hallden-Aberton et al. ......... | 428/36.92 |
| 5,318,742 | 6/1994 | You .......................................... | 264/516 |
| 5,318,819 | 6/1994 | Pai ........................................... | 428/71 |

FOREIGN PATENT DOCUMENTS

| | | |
|---|---|---|
| 2705078 | 11/1994 | France . |
| 2725979 | 12/1977 | Germany . |
| 3934710 | 4/1991 | Germany . |
| 2223711 | 4/1990 | United Kingdom . |
| WO90/10570 | 9/1990 | WIPO . |

*Primary Examiner*—Brian L. Johnson
*Assistant Examiner*—Gary Savitt
*Attorney, Agent, or Firm*—Greenblum & Bernstein P.L.C.

[57] ABSTRACT

A bicycle frame includes a body and a rigid or vertical suspension and an interchangeable triangular rear assembly. The body includes three pultruded profile sections interconnected by three overmolded housings made of a thermoplastic material comprising a semi-aromatic resin matrix. The interchangeable triangular rear assembly may be mechanically secured to the body via bosses and an output coupling. The frame has vibration damping properties. A method for making and assembling the same is also disclosed.

20 Claims, 8 Drawing Sheets

BICYCLE FRAME

BACKGROUND OF THE INVENTION

1. Field of the Invention

The present invention relates to an adjustable bicycle frame, to the method for manufacturing and assembling same, as well as to such a frame having an interchangeable triangular rear assembly.

2. Description of Related Art

Currently, manufactured frames are primarily obtained by means of welded, soldered or glued metallic profile sections. Some are obtained by adhesion of elements made of carbon or carbon-KEVLAR (trademark) composite materials. Others are obtained by molding of materials such as dural or magnesium light alloys, or by pressure casting of glass or carbon fiber-reinforced thermoplastic materials.

The manufacture of bicycle frames according to these methods has some disadvantages.

With respect to frames made of steel or light alloys, assembled by mechanical welding, the deformations caused by overheated portions require passage of a surface plate in order to straighten them, the conformance to geometrical tolerances being thereby rendered very uncertain. Additionally, production periods are very long and therefore expensive.

Furthermore, the lack of elasticity in these materials subjects the frames to permanent deformations in the case of shocks.

Furthermore, an excessive rigidity associated with a very good propagation of vibration waves renders the bicycle frames very uncomfortable.

Some of the above materials are sensitive to corrosion and therefore require varnish or paint protection, preceded by a pretreatment rendering the application of a decorative finish delicate and expensive.

The above materials with a natural dark color limit the decoration processes such as sublimation.

Frames obtained by molding of aluminum- or magnesium-based light alloys require lengthy post-manufacturing deburring and machining operations.

Glass or carbon reinforced thermoplastic materials considered until now offer flexural moduli not exceeding 15,000 Mpa. In order to obtain a good flexural and torsional stiffness in these conditions, the thickness of the sections constituting the frames must then be oversized, at the expense of increased weight and cost.

With respect to frames formed of carbon or carbon-KEVLAR composite materials, in addition to the high cost of the materials, the processing periods are very long, resulting in prohibitive costs.

The proximity of the metallic elements in the environment of these materials has a tendency to produce a catalytic effect detrimental to these assemblies that require good contacts.

SUMMARY OF THE INVENTION

The bicycle frame according to the invention should make it possible to considerably simplify the manufacturing and assembling process and, therefore, to reduce the costs in a significant manner. The use of thermoplastic materials with a partially aromatic resin matrix makes it possible to have flexural moduli greater than 20,000 Mpa and, mixed with certain additives, these materials achieve a good compromise of rigidity, comfort, resistance to corrosion, and are easily decorated.

Moreover, the rear portion is interchangeable and thus can enable the user to adapt to all terrains.

Indeed, the frame according to the invention is composed of a body constituted of three pultruded profile sections capable of being coextruded in a thermoplastic coating with a partially aromatic resin matrix, assembled to one another by a steering housing, a saddle rod housing and a crank-gear housing, all three being molded of a thermoplastic material with a partially aromatic resin matrix.

The molecular structure of such material is comparable to the structure of a certain polyamide, "66", the difference being that polyamide 66 comprises a molecular interchain matrix of adipic acid, whereas an aromatic polyamide comprises a molecular interchain matrix of isophthalic acid, these matrices being grafted on hexamethylenediamine-type molecular chains.

Such materials with a partially aromatic resin matrix have flexural moduli greater than 20,000 Mpa and ultimate tensile strengths greater than 250 kg/mm$^2$. These properties, associated with judiciously selected section moments of inertia, make it possible to compete, with respect to rigidity, with profile sections made of steel or light alloys.

Furthermore, the intrinsic elastic characteristics of such materials avoid the risks of permanent deformations in the case of shocks.

The insertion of elastomeric loads make it possible to shield from the propagation of vibration waves.

The insertion of mineral isotropic loads makes it possible to optimize the torsional moment.

The insertion of anti-oxidant agents makes it possible to deactivate any catalytic effect in the environments of the metallic elements.

The insertion of anti-static agents makes it possible to obtain the decorations away from any dust pollution.

The assembly and connections of the profile sections with the housings are ensured by the thermal shrinking of the thermoplastic with a partially aromatic matrix after the molding, during the cooling.

The molds of the saddle rod housings and of the crank-gear housings are provided with interchangeable blocks (Z) allowing for different types of attachment of the rear wheel triangular: attachment by over-molding, bolting or by means of a vertical suspension.

BRIEF DESCRIPTION OF THE DRAWINGS

The foregoing and other objects, features, and advantages of the invention will be apparent from the following more particular description of the preferred embodiment as illustrated in the accompanying drawings in which reference characters refer to the same parts throughout the various views, and wherein.

DETAILED DESCRIPTION OF PREFERRED EMBODIMENTS

With reference to the drawings, the frame according to the invention is constituted of a body composed of three pultruded profile sections 1, 2, 3, an upper profile section 1, a lower profile section 2, and a vertical profile section 3.

The profile sections 1, 2 and 3 are manufactured either continuously by pultrusion, or continuously by coextrusion of a thermoplastic coating with a partially aromatic resin matrix on a pultruded profile section.

The pultrusion makes it possible to manufacture, by continuous drawing, profile sections of various shapes from glass or carbon fiber-reinforced thermosetting materials.

Figure 2A:
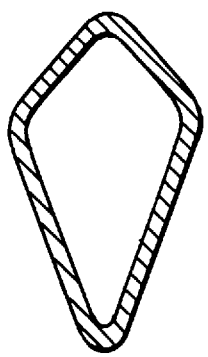
FIG. 2a shows a possible cross section for the profile sections.
Figure 2B:
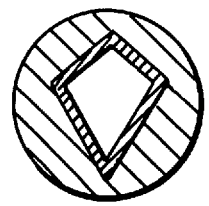
FIG. 2b shows a possible cross section of a coextruded profile section.

The possible cross section of the profiles 1, 2 and 3 can be circular or have the shape of an isosceles quadrangle (FIG. 2a) or both, in the case of a coextrusion (FIG. 2b).

Figure 2C:
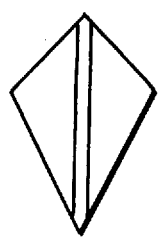
FIG. 2c shows a cross section of a profile section provided with a vertical rib.
Figure 2D:
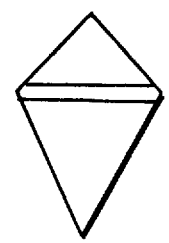
FIG. 2d shows a cross section of a profile section provided with a horizontal rib.

A vertical (FIG. 2c) or horizontal (FIG. 2d) inner rib can be added so as to increase the torsional strength.

The body according to the invention is also constituted of three junction housings; a steering housing 5, a saddle rod housing 6, and a crank-gear housing 7.

The casings 5, 6 and 7 are molded of a thermoplastic material with a partially aromatic resin matrix.

Figure 1A:
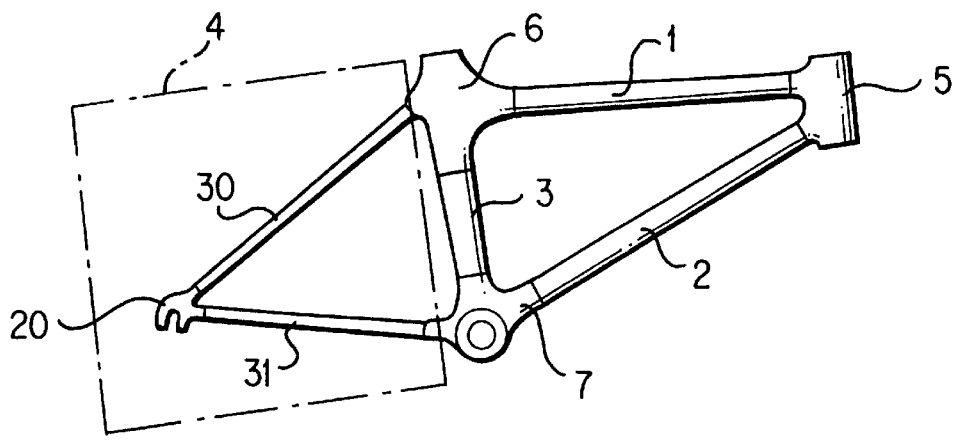
FIG. 1a shows the frame according to the invention equipped with an overmolded rigid rear.
Figure 1B:
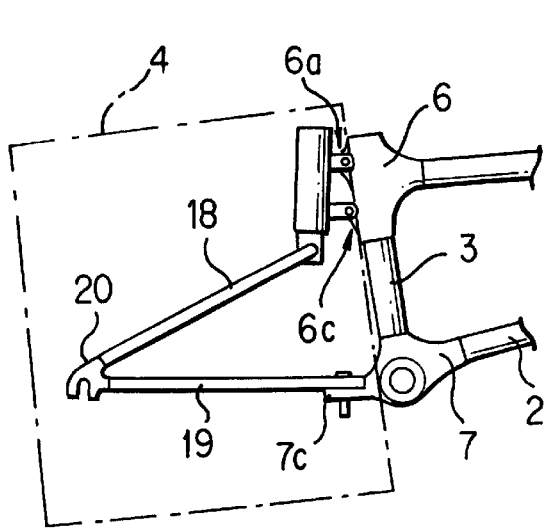
FIG. 1b shows the frame according to the invention equipped with a vertical-suspension rear.
Figure 1C:
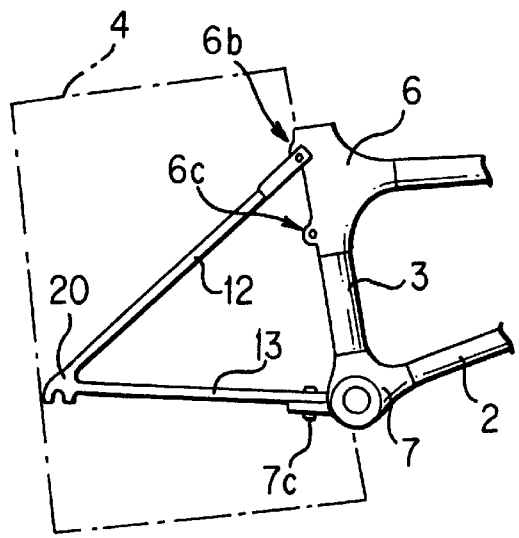
FIG. 1c shows the frame according to the invention equipped with an overmolded rigid rear.

The frame according to the invention comprises a triangulation for attaching the rear wheel 4, constituted of two guys and two bases, as follows:

guys 12 and bases 13 in the case of a rear bolted on the body (FIG. 1c);

guys 18 and bases 19 in the case of a rear with a vertical suspension (FIG. 1b);

guys 30 and bases 31 in the case of an overmolded rear (FIG. 1a).

Figure 2E:
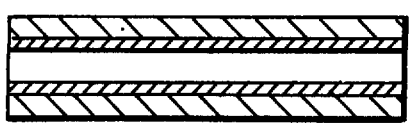
FIG. 2e shows a cross section along the length of a coextruded profile section.
Figure 2F:
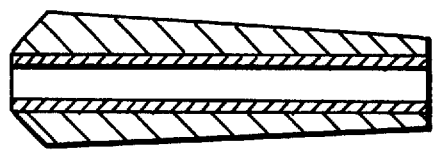
FIG. 2f shows a cross section along the length of an overmolded profile section.

According to particular embodiments of the invention, the guys and the bases can be obtained as follows:

by injection molding of a thermoplastic material with a partially aromatic resin matrix;

by coextrusion of a thermoplastic coating with a partially aromatic resin matrix on a profile section made of a thermosetting resin (FIG. 2e).

by overmolding of a thermoplastic coating with a partially aromatic resin matrix having a thickness comprised between 0.5 and 12 mm on a profile section made of a thermosetting resin (FIG. 2f).

The thermoplastic materials usable as the partially aromatic resin matrix within the composition of the profile sections, of the junction housings, of the guys and bases are selected from among those whose flexural modulus is greater than 17,000 Mpa and whose ultimate tensile strength is greater than 240 kg/mm$^2$.

The thermoplastic materials useable as the partially aromatic resin matrix within the composition of the profile sections, of the junction housings, of the guys and bases comprise:

a percentage by volume of elastomer comprised between 0.1 and 10%;

a percentage by volume of an isotropic mineral load, such as barium silicate, comprised between 0.1 and 30%;

an anti-oxidant agent such as phenol, mercaptan, phosphite or hydroxyethylalkylamine.

an anti-static agent such as quaternary ammonium compounds, polyol esters or organic phosphates.

With reference to FIGS. 3a, 4, 5, and 6, before the overmolding, the profile sections 1, 2 and 3 are obstructed by plugs 5b, 5c, 6d, 7f and 7e. The particularity of these plugs according to the invention is that they are provided with parallel wings, as shown in FIGS. 3b and 3c.

The object of these wings is as follows: during the molding of the junction housings, the melting material fills the spaces between the wings in a homogeneous fashion, thus avoiding excessive masses of plastic material between the ends of the profile sections and of the tubes 5a, 6a and 7b. Excessive masses unequally distributed would cause internal retractions in the mass and accumulations of internal constraints, systematically generating deformations that are detrimental to the geometry of the frame.

Figure 3A:
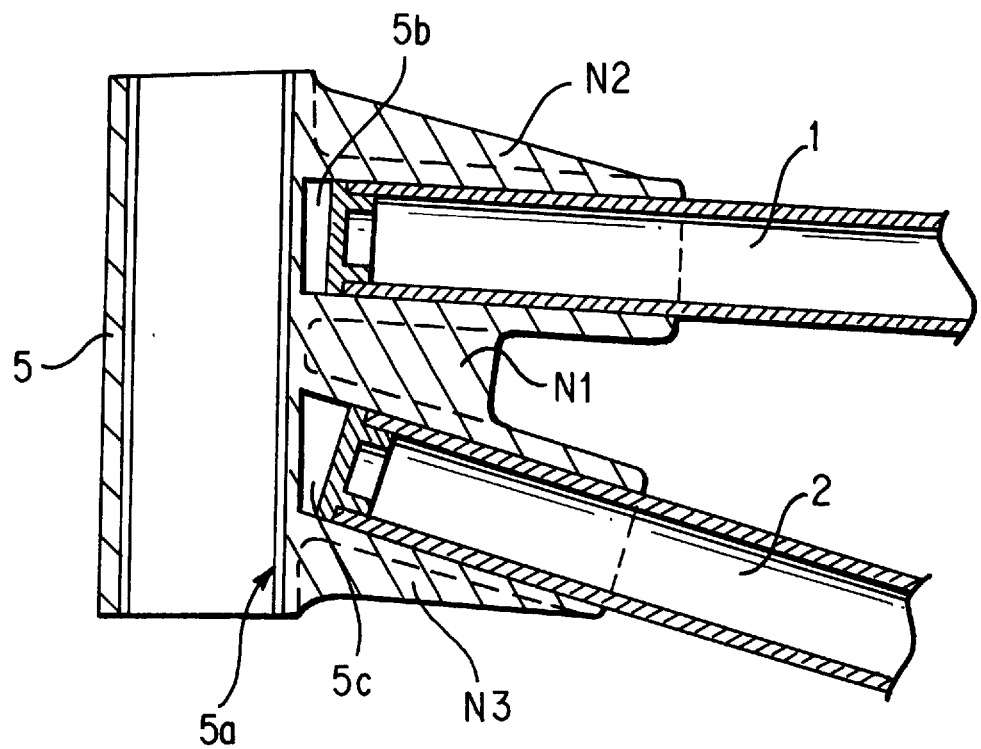
FIG. 3a shows the steering housing.
Figure 3B:
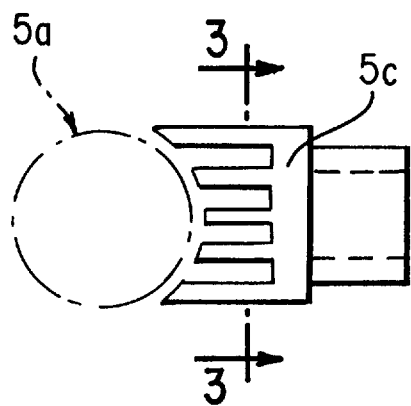
FIG. 3b shows a plug provided with its wings.
Figure 3C:
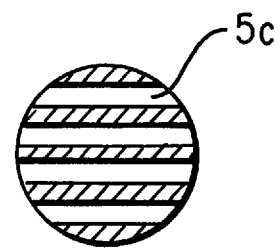
FIG. 3c shows a cross section of the wings of a plug taken along line 3—3 of FIG. 3b.

With reference to FIG. 3a, the steering housing comprises a vertical tube 5a for the passage of the fork pin, and three reinforcing ribs N1, N2 and N3 which are vertically positioned, and whose object is to reinforce the overmolding zones of the profile sections 1 and 2.

Figure 4:
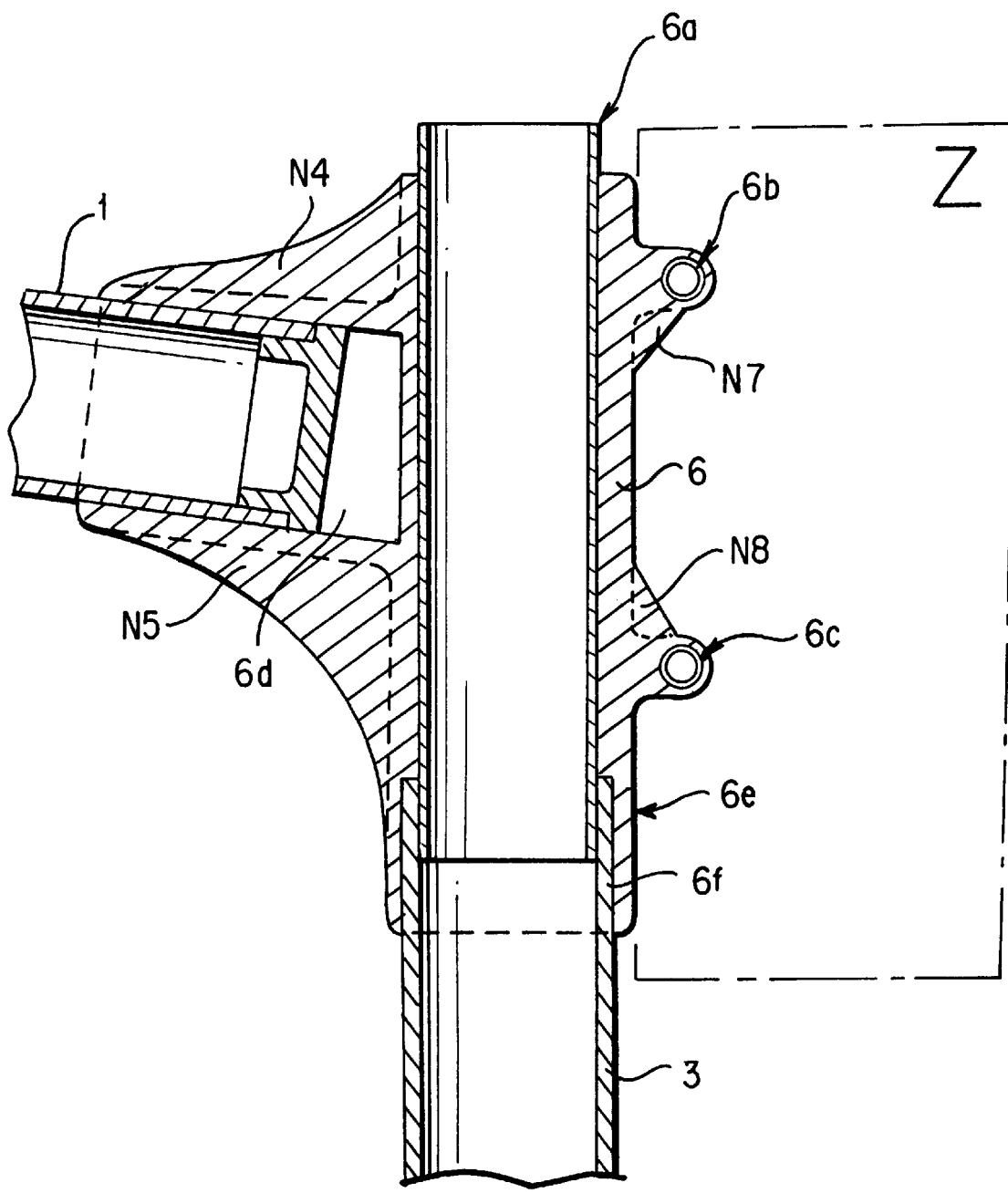
FIG. 4 shows the saddle rod housing provided with two bosses.

The mold of the saddle rod housing has an interchangeable block Z whose object is the obtention of two versions as follows:

Version 1: with reference to FIG. 4, the saddle rod housing comprises a tube for housing the saddle rod 6a, two bosses 6b, 6c located on the same vertical axis, the bosses each being provided with a traversing spacer 6g, and reinforcing ribs N7 and N8.

Figures 5, 5A:
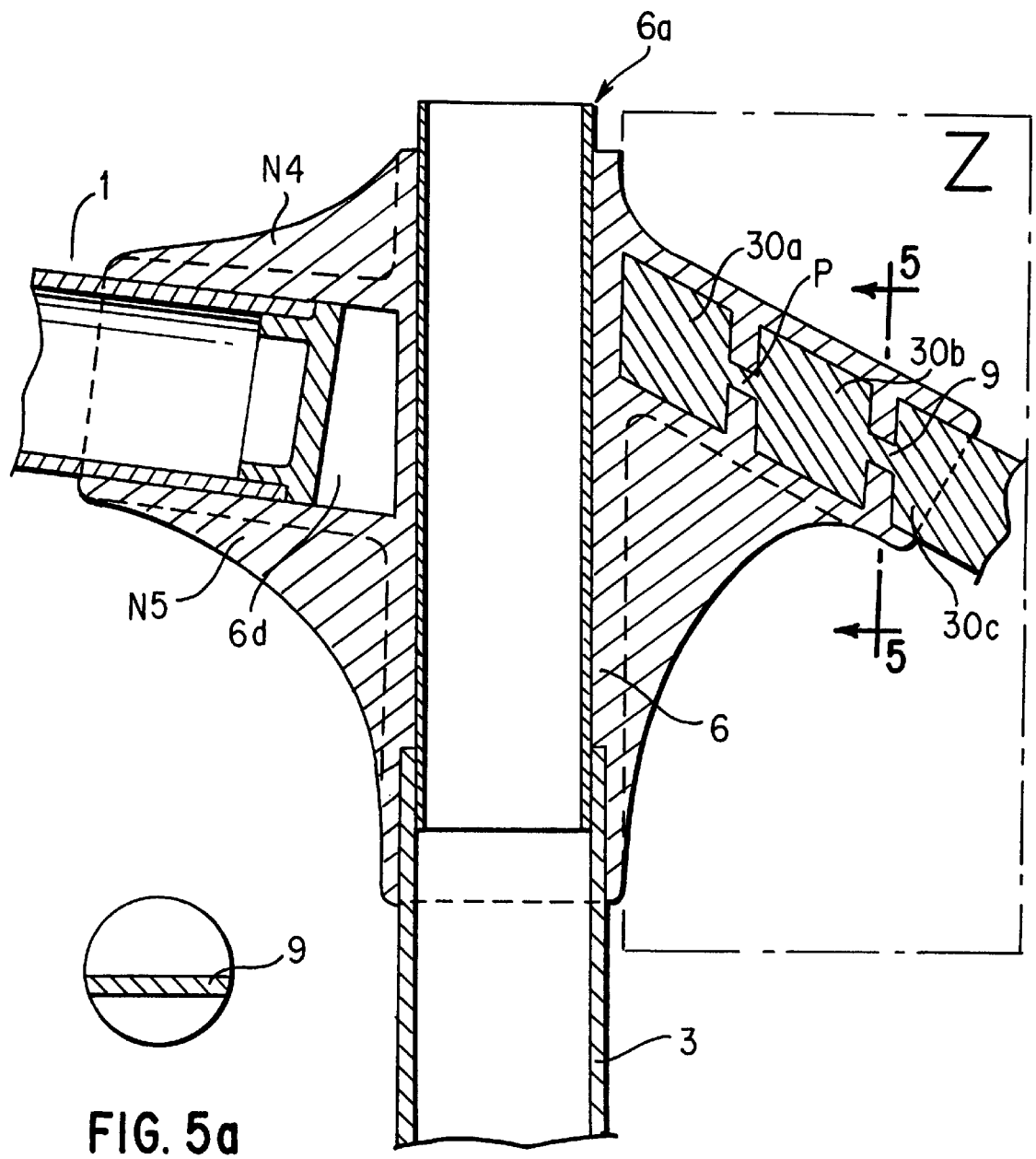
FIG. 5 shows the saddle rod housing provided with an overmolded rear.
FIG. 5a shows a cross section of the overmolded rear taken along line 5—5 of FIG. 5.

Version 2: with reference to FIG. 5, the saddle rod housing comprises a tube for housing the saddle rod 6a. In this version, the guys 30 are overmolded in the interchangeable block Z. The guys comprise, at their end, three zones 30a, 30b and 30c having a semi-cylindrical section and a radius comprised between 4 and 15 mm, connected to one another by two ribs p and q having a thickness comprised between 1 and 10 mm.

Figure 6:
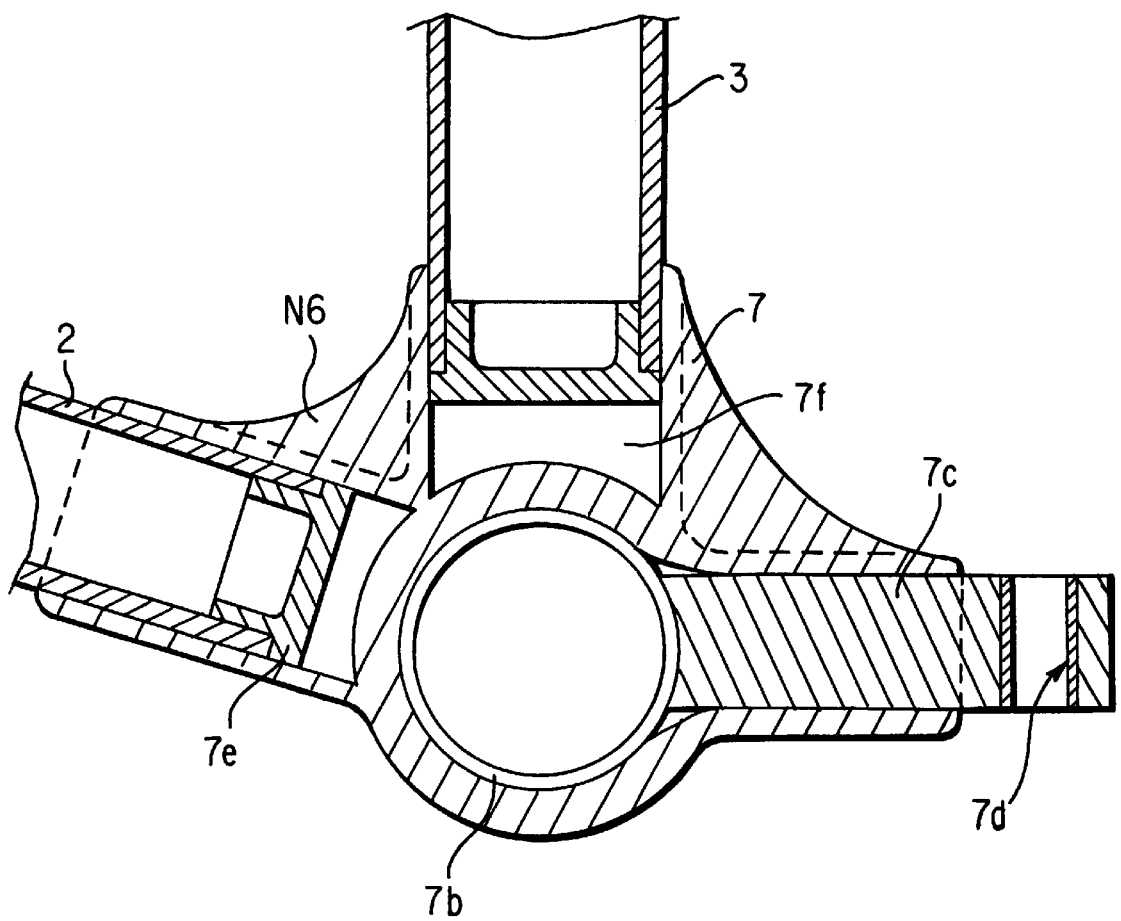
FIG. 6 shows the crank-gear housing provided with a cap.
Figure 7:
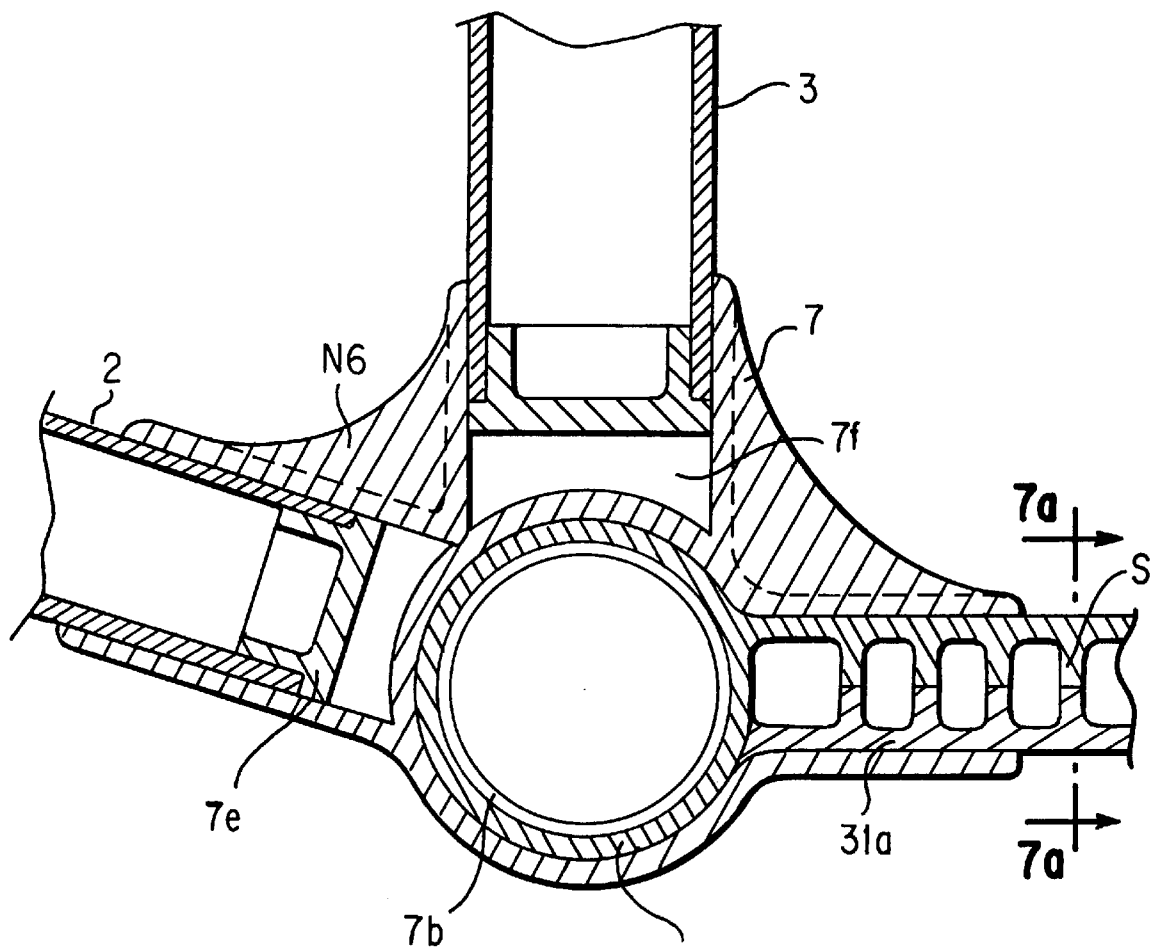
FIG. 7 shows the crank-gear housing provided with an overmolded rear.
Figure 7A:
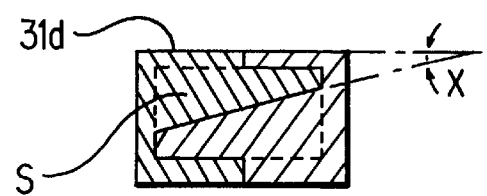
FIG. 7a shows a cross section of the overmolded rear taken along line 7a—7a of FIG. 7.
Figure 8:
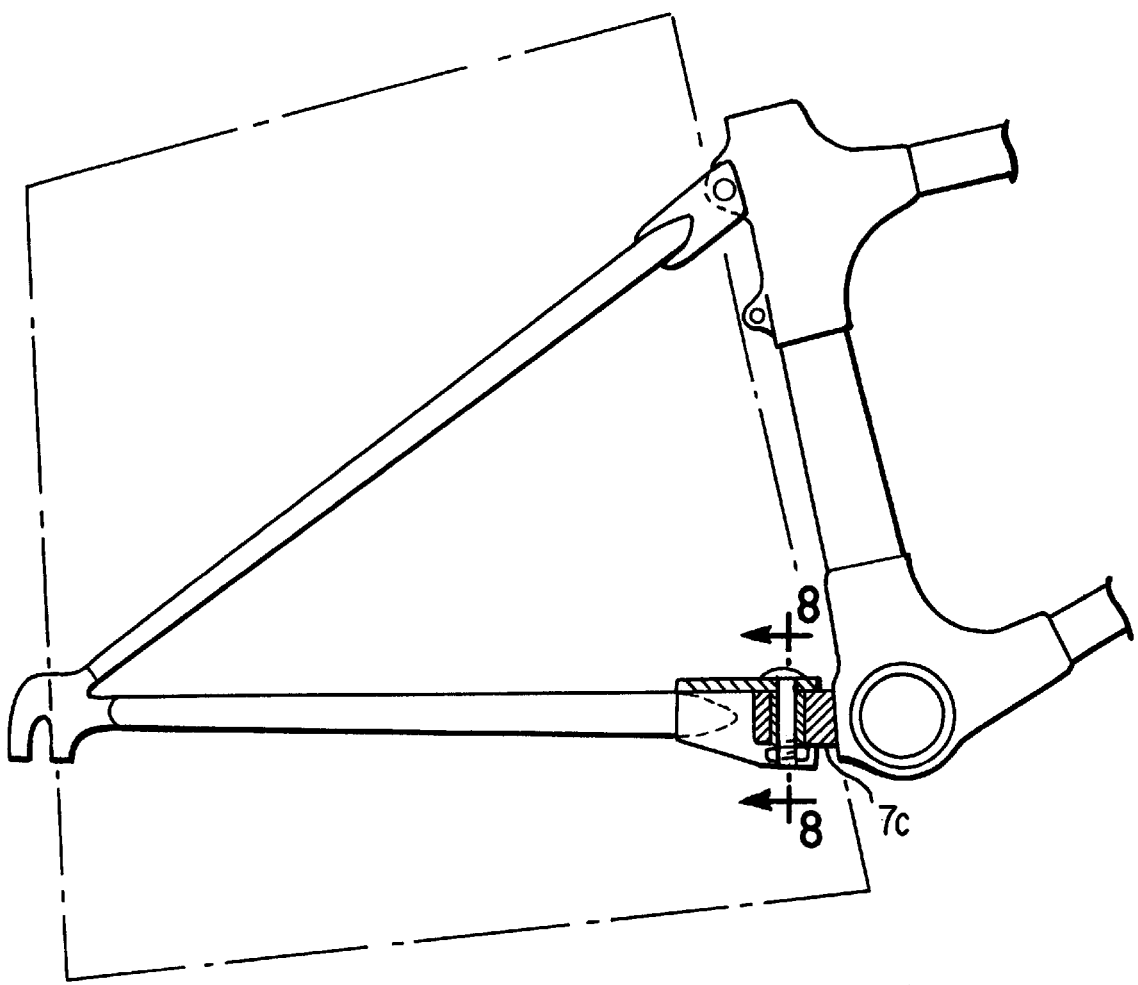
FIG. 8 shows a rigid triangulation bolted on the body.
Figure 8A:
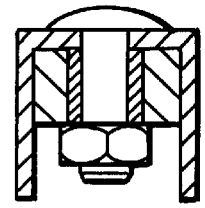
FIG. 8a shows a cross section of FIG. 8 taken along line 8—8 of FIG. 8.

In the crank-gear mold, it is possible to obtain two versions as follows:

version 1: with reference to FIG. 6, the crank-gear housing comprises a tube for housing the crank-gear axle 7b on which a rectangular cap 7c is welded, the cap being provided with a tubular guide brush 7d.

version 2: with reference to FIG. 6, the crank-gear housing comprises a tube for housing the crank-gear axle 7b. In this version, the bases 31 are overmolded in the crank-gear housing. The bases comprise, at their end 31a, a ring r with a diameter comprised between 30 and 70 mm and a width comprised between 1 and 70 mm.

The connection zone 31a between the ring r and the remainder of bases 31 comprises internal ribs s whose at least one edge forms an angle x with one of the external surfaces such as 31d the zone 31a. A judicious selection of the position of the angle x makes it possible to assemble two bases together by a mere reversal.

The bases 31 are centered on the tubes 7b by means of the rings r.

What is claimed:

1. A bicycle frame comprising:
   pultruded profile sections, said pultruded profile sections being plugged at their ends;
   junction housings, said pultruded profile sections and said junction housings thus forming a body; and
   a triangulation for attaching a rear wheel to said body, said triangulation comprising bases and guys, being fixed to said body by said junction housings;
   wherein said junction housings connecting the profile sections, and connecting the bases and the guys, are molded from a thermoplastic material comprising a partially aromatic resin.

2. The bicycle frame of claim 1, wherein said bases and said guys are molded from a thermoplastic material comprising a partially aromatic resin.

3. The bicycle frame of claim 1, wherein said bases and guys are formed by co-extruding a thermoplastic resin and a partially aromatic resin to form a profile section coated with a partially aromatic resin.

4. The bicycle frame of claim 1, wherein said bases and said guys are formed by overmolding a thermoplastic coating of a partially aromatic resin on a profile section formed of a thermosetting resin, and said coating has a thickness of between 0.5 mm and 12 mm.

5. The bicycle frame of claim 1, wherein said pultruded profile sections comprise a co-extruded coating of a thermoplastic material comprising a partially aromatic resin.

6. The bicycle frame of claim 1, wherein said thermoplastic material comprising a partially aromatic resin comprises an elastomer in an amount of between 0.1 to 10% by volume.

7. The bicycle frame of claim 1, wherein said thermoplastic material comprising a partially aromatic resin comprises an isotropic mineral load of between 0.1 to 30% by volume.

8. The bicycle frame of claim 1, wherein said thermoplastic material comprising a partially aromatic resin comprises an anti-oxidant.

9. The bicycle frame of claim 1, wherein said thermoplastic material comprising a partially aromatic resin comprises an anti-static agent.

10. The bicycle frame of claim 1, wherein said pultruded profile sections are plugged at their ends with plugs comprising parallel wings.

11. The bicycle frame of claim 1, wherein said pultruded profile sections comprise a horizontal inner rib.

12. The bicycle frame of claim 1, wherein said pultruded profile sections comprise a vertical inner rib.

13. The bicycle frame of claim 1, wherein said junction housings comprise a saddle rod housing comprising two bosses arranged in a common vertical axis.

14. The bicycle frame of claim 13, wherein said bosses comprise a traversing spacer.

15. The bicycle frame of claim 1, wherein said junction housings comprise a crank gear housing comprising a rectangular cap comprising a tubular guide bush.

16. The bicycle frame of claim 1, wherein said pultruded profile sections are isosceles quadrangles.

17. The bicycle frame of claim 1, wherein said guys comprise an end having three zones, and each of said zones has a semi-cylindrical section having a radius of between 4 mm and 15 mm, and said zones being connecting to each other by ribs having a thickness of between 1 mm and 10 mm.

18. The bicycle frame of claim 1, wherein said bases comprise an end having a ring with a diameter of between 30 mm and 70 mm and a width of between 1 mm and 70 mm.

19. The bicycle frame of claim 18, wherein said bases comprise a remainder and a connection zone, said connection zone being disposed between said ring and said remainder and having an external surface and comprising inner ribs having at least one edge forming an angle with said external surface of said connection zone.

20. A bicycle frame, wherein said frame consists essentially of pultruded profile sections, said pultruded profile sections being plugged at their ends;
   junction housings, said pultruded profile sections and said junction housings thus forming a body; and
   a triangulation for attaching a rear wheel to said body, said triangulation comprising bases and guys, being fixed to said body by said junction housings;
   wherein said junction housings connecting the profile sections, and connecting the bases and the guys, and said bases and said guys are molded from a thermoplastic material comprising a partially aromatic resin.

* * * * *